United States Patent
Yamazaki et al.

(10) Patent No.: US 7,332,830 B2
(45) Date of Patent: Feb. 19, 2008

(54) RAINFALL DETERMINATION APPARATUS AND METHOD

(75) Inventors: Masayuki Yamazaki, Utsunomiya (JP); Koji Yamaoka, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 263 days.

(21) Appl. No.: 11/088,143

(22) Filed: Mar. 22, 2005

(65) Prior Publication Data
US 2005/0218723 A1    Oct. 6, 2005

(30) Foreign Application Priority Data
Mar. 31, 2004    (JP)    ............... 2004-103519

(51) Int. Cl.
*B60L 1/00* (2006.01)
(52) U.S. Cl. ............ 307/10.1; 307/10.8; 315/82; 701/36
(58) Field of Classification Search ............ 307/10.1, 307/10.8; 315/82, 83; 701/36
See application file for complete search history.

(56) References Cited

U.S. PATENT DOCUMENTS 5,187,383 A * 2/1993 Taccetta et al. ............ 307/10.8
6,310,458 B1 * 10/2001 Fenstermacher ............ 318/603

FOREIGN PATENT DOCUMENTS

| DE | 19630216 | 5/1998 |
| EP | 1232071 | 8/2002 |
| GB | 2130030 | 5/1984 |
| GB | 2130030 A * | 5/1984 |
| JP | 2000-168435 | 6/2000 |

* cited by examiner

Primary Examiner—Robert L. Deberadinis
Assistant Examiner—Daniel Cavallari
(74) Attorney, Agent, or Firm—O'Melveny & Myers LLP (57) ABSTRACT

A rainfall determination apparatus for determining rainfall based on data relating to a wiping operation of a wiper. The apparatus includes a detection device for detecting the wiping operation every time this operation is performed; a timer for starting to clock a predetermined period of time for each wiping operation; a counter for counting the number of times of the wiping operation performed before the predetermined period of time has elapsed; and a determination device for determining that rainfall occurs when the counter counts a predetermined number of times of the wiping operation which is successively performed. The timing of lighting the headlight of a vehicle can be changed in accordance with the result of the determination about the rainfall situation based on the wiping operation of the existing wiper. The apparatus is inexpensive and can be easily built in an automatic lighting system for vehicles, which is relatively expensive.

6 Claims, 6 Drawing Sheets

RAINFALL DETERMINATION APPARATUS AND METHOD

BACKGROUND OF THE INVENTION

1. Field of the Invention

The present invention relates to a rainfall determination apparatus and to a method suitable for an automatic lighting system for vehicles, or the like.

Priority is claimed on Japanese Patent Application No. 2004-103519, filed Mar. 31, 2004, the content of which is incorporated herein by reference.

2. Description of Related Art

In a known rainfall determination apparatus and method applied to vehicles, clocking and counting of the number of times of wiping are performed in accordance with each operation mode of the wiper (i.e., intermittent, low speed, or high speed mode), and rainfall is detected (i.e., it is determined that there is rain) when the clocked time and the counted number of times of wiping respectively reach specific values (see Japanese Unexamined Patent Application, First Publication No. 2000-168435, etc.). More specifically, in the intermittent mode, a timer for clocking a first time and a counter for counting the number of times of wiping within the first time are provided, and in each of the low speed mode and the high speed mode, a timer and a counter corresponding to the mode are also provided, which are controlled by specific conditions corresponding to each operation mode of the wiper.

However, such timer and counter for exclusive use for each operation mode of the wiper, which are controlled by conditions depending on each mode, make the structure of the rainfall determination apparatus and method complicated. In particular, in consideration of application of the rainfall determination apparatus and method to an automatic lighting system for vehicles, the automatic lighting system itself is a relatively expensive system due to usage of an illumination sensor and the like, and the above complication in the structure causes further increase in the system's expense. Accordingly, vehicles to which the system can be applied are limited, thereby reducing flexibility.

SUMMARY OF THE INVENTION

In consideration of the above circumstances, an object of the present invention is to provide a rainfall determination apparatus and method, having a simple structure and superior cost performance.

Therefore, the present invention provides a rainfall determination apparatus for determining rainfall based on data relating to a wiping operation of a wiper, the apparatus comprises:

a detection device (e.g., a detection section 22 in an embodiment explained below) for detecting the wiping operation every time this operation is performed;

a timer (e.g., a timer 24 in the embodiment) for starting to clock a predetermined period of time for each wiping operation;

a counter (e.g., a counter 23 in the embodiment) for counting the number of times of the wiping operation performed before the predetermined period of time has elapsed; and a determination device (e.g., a determination section 25 in the embodiment) for determining that rainfall occurs when the counter counts a predetermined number of times of the wiping operation which is successively performed.

The present invention also provides a rainfall determination method of determining rainfall based on data relating to a wiping operation of a wiper, the method comprises the steps of:

detecting the wiping operation every time this operation is performed (see, for example, step S6 in the embodiment);

starting to clock a predetermined period of time for each wiping operation (see, for example, step S5 in the embodiment);

counting the number of times of the wiping operation performed before the predetermined period of time has elapsed (see, for example, step S3 in the embodiment); and determining that rainfall occurs when the counter counts a predetermined number of times of the wiping operation which is successively performed (see, for example, step S9 in the embodiment).

According to the above apparatus or method, the structure of the necessary components is simplified and no complicated control is necessary, thereby improving the cost performance, reducing the failure rate, and improving reliability.

The present invention also provides a rainfall determination apparatus used for performing automatic lighting control for a vehicle, the apparatus comprises:

an illumination measuring device (e.g., an illumination sensor 11 in the embodiment) for measuring illumination outside the vehicle;

a rainfall determination device (e.g., a rainfall determination circuit 21 in the embodiment) for determining rainfall based on data relating to a wiping operation of a wiper of the vehicle; and a lighting control device (e.g., a lighting control circuit 26 in the embodiment) for lighting a headlight (e.g., a headlight 14 in the embodiment) provided at the vehicle when the illumination measured by the illumination measuring device is less than a predetermined value and for changing the predetermined value when the rainfall determination device determines that a predetermined condition is satisfied, wherein the rainfall determination devices includes a detection device (e.g., a detection section 22 in the embodiment) for detecting the wiping operation every time this operation is performed, a timer (e.g., a timer 24 in the embodiment) for starting to clock a predetermined period of time for each wiping operation, and a counter (e.g., a counter 23 in the embodiment) for counting the number of times of the wiping operation before the predetermined period of time has elapsed; and the predetermined condition is that the wiping operation performed before the predetermined period of time has elapsed is successively detected and the counted number of times reaches a predetermined value.

Preferably, the lighting control device changes the predetermined value for the illumination in accordance with an amount of rainfall which is evaluated by accumulating the period of time clocked by the timer.

The present invention also provides a rainfall determination method used for performing automatic lighting control for a vehicle which comprises an illumination measuring device (e.g., an illumination sensor 11 in the embodiment) for measuring illumination outside the vehicle; a rainfall determination device (e.g., a rainfall determination circuit 21 in the embodiment) for determining rainfall based on data relating to a wiping operation of a wiper of the vehicle; and a lighting control device (e.g., a lighting control circuit 26 in the embodiment) for lighting a headlight (e.g., a headlight 14 in the embodiment) provided at the vehicle when the illumination measured by the illumination measuring device is less than a predetermined value and for changing the predetermined value when the rainfall determination device determines that a predetermined condition is satisfied, wherein:

the rainfall determination device executes the steps of:

detecting the wiping operation every time this operation is performed (see, for example, step S6 in the embodiment);

starting to clock a predetermined period of time for each wiping operation (see, for example, step S5 in the embodiment); and counting the number of times of the wiping operation before the predetermined period of time has elapsed (see, for example, step S3 in the embodiment), and the predetermined condition is that the wiping operation performed before the predetermined period of time has elapsed is successively detected and the counted number of times reaches a predetermined value.

Preferably, the lighting control changes the predetermined value for the illumination in accordance with an amount of rainfall which is evaluated by accumulating the period of time clocked by the timer.

Therefore, a system according to the above apparatus or method can be easily combined with an automatic lighting system for vehicles, thereby improving salability of the automatic lighting system.

According to the present invention, it is possible to change the timing of lighting the headlight in accordance with the result of the determination about the rainfall situation based on the wiping operation of the existing wiper. Therefore, in comparison with the structure using a rain (drop) sensor which employs a photodiode or the like, the system according to the present invention is inexpensive and can be easily built in an automatic lighting system for vehicles, which is relatively expensive.

DETAILED DESCRIPTION OF THE INVENTION

Hereinafter, embodiments according to the present invention will be explained with reference to the drawings.

First Embodiment

Figure 1:
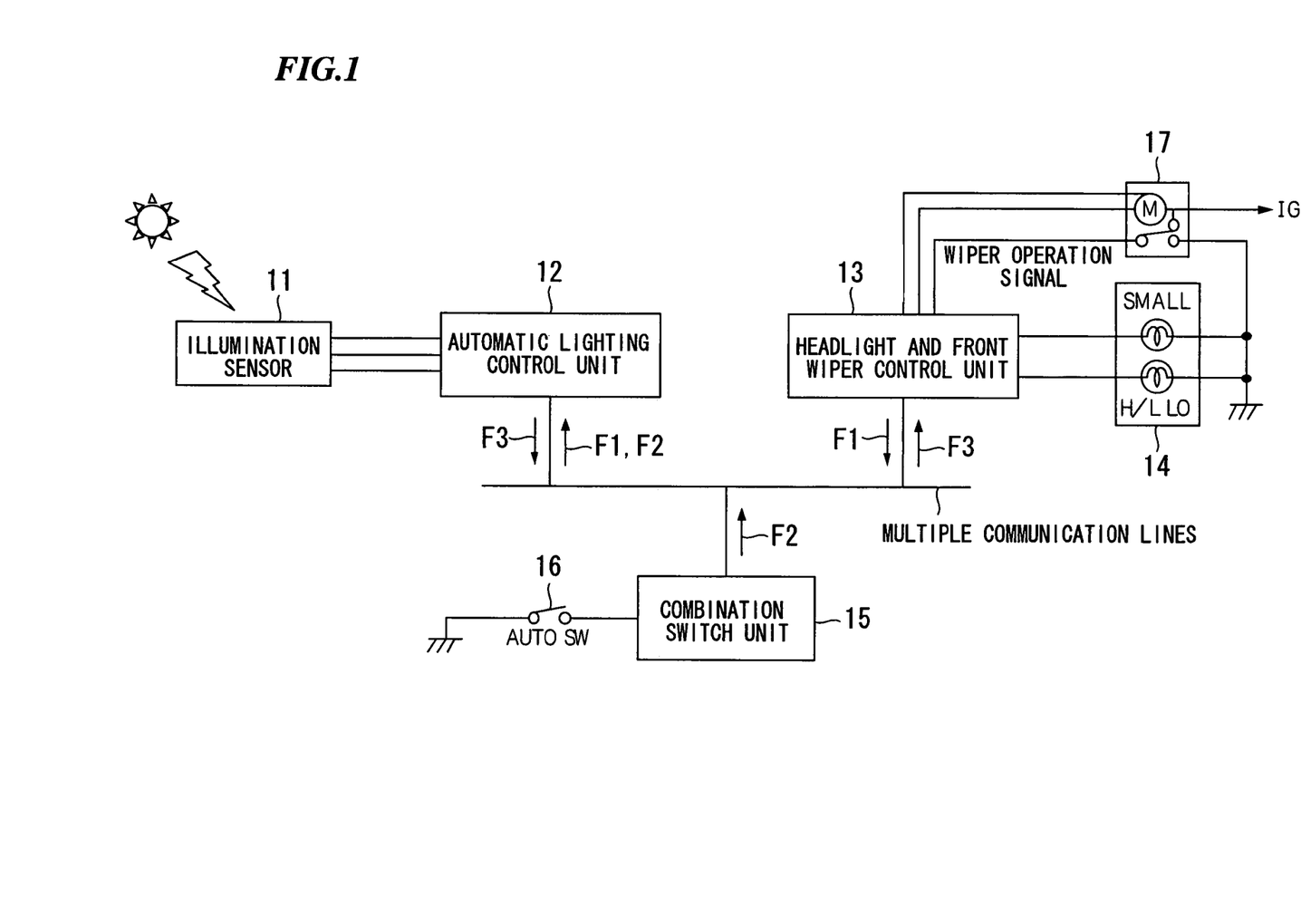
FIG. 1 is a diagram showing the structure of a vehicle automatic lighting system in an embodiment according to the present invention.

FIG. 1 is a diagram showing the structure of a vehicle automatic lighting system in the first embodiment, in which a rainfall determination apparatus is built. As shown in the figure, the vehicle automatic lighting system includes (i) an illumination sensor 11 (i.e., an illumination measuring device) for measuring illumination (i.e., brightness) outside the vehicle, that is, illumination in the environment where the vehicle runs, (ii) an automatic lighting control unit 12 to which a measurement signal from the illumination sensor is input, and (iii) a headlight and front wiper control unit 13, to which a designation signal is input from the automatic lighting control unit 12, for controlling actual loads on each device.

The automatic lighting control unit 12 and the headlight and front wiper control unit 13 are connected via multiple communication lines, together with a combination switch unit 15. When the ignition switch is on and the auto switch 16 (i.e., the automatic lighting operation switch) is also on, an auto switch signal (indicated by reference symbol F2 in FIG. 1) is input via the combination switch unit 15 to the automatic lighting control unit 12, and the measurement signal with respect to the illumination outside the vehicle is also input from the illumination sensor 11 to the automatic lighting control unit 12. Based on the above signals, on/off of the headlight 14 is determined in the automatic lighting control unit 12, and a designation signal (indicated by reference symbol F3 in FIG. 1) according to the determination is input into the headlight and front wiper control unit 13, so that a low beam and small lamp in the headlight 14 is switched on or off.

The headlight and front wiper control unit 13 also controls driving of the wiper motor 17. To the driving shaft of the wiper motor 17, a front wiper (not shown, simply called a "wiper" hereinbelow) is coupled via a slider crank mechanism, and every time the driving shaft makes one revolution, the wiper performs wiping operation one time (i.e., single wiping operation). When the ignition switch is on, the above wiper motor 17 is driven and controlled so as to operate the wiper in an operation mode selected by the combination switch unit 15.

In the combination switch unit 15, except for the wiper "off" state (i.e., in which the wiper is not operated), each of three modes for the wiper can be selected, which are an intermittent operation mode, a low speed operation mode, and a high speed operation mode. When the intermittent operation mode is selected, the intermittent period of time can be varied, for example, within a range from 2 seconds to less than 15 seconds.

From the wiper motor 17, a wiper operation signal (indicated by reference symbol F1 in FIG. 1) is output every time the driving shaft makes one revolution (i.e., the wiper performs a single wiping operation). The wiper operation signal, indicating the wiping operation of the wiper by using an ON/OFF level of the signal, is input via the headlight and front wiper control unit 13 to the automatic lighting control unit 12. When the ON and OFF states continuously alternate specific times in the wiper operation signal, it is determined in the automatic lighting control unit 12 that rain is falling on the vehicle, and in accordance with the determination, the threshold of illumination, used for switching on or off the headlight 14, is changed.

Figure 2:
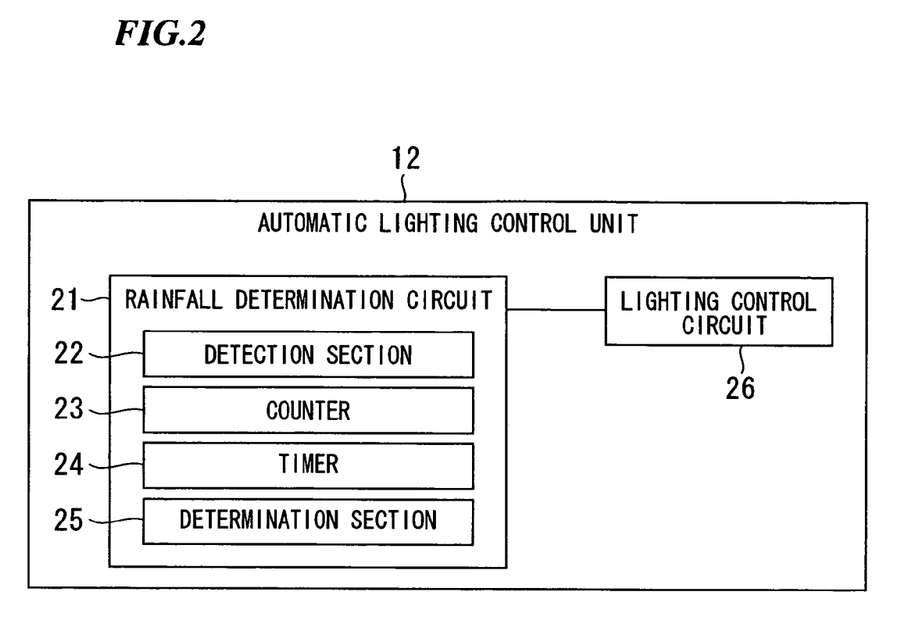
FIG. 2 is a diagram showing the structure of the main components of the automatic lighting control unit in the automatic lighting system.

As shown in FIG. 2, the automatic lighting control unit 12 has a rainfall determination circuit 21 (i.e., the rainfall determination device) and a lighting control circuit 26 (i.e., the lighting control device) connected to the rainfall determination circuit 21. The rainfall determination circuit 21 includes (i) a detection section 22 (i.e., the detection device) for detecting switching from OFF to ON of the wiper operation signal (i.e., the wiping operation of the wiper), (ii) a timer 24 for clocking a period of time every time the state of the wiper operation signal is switched, (iii) a counter 23 for counting the number of times of wiping operation performed when the period of time clocked by the timer 24 is less than a predetermined value, and (iv) a determination section 25 (i.e., the determination device) for determining that rainfall occurs when the number of times counted by the counter 23 reaches a predetermined value.

The lighting control circuit 26 lights the headlight 14 when the measurement value obtained by the illumination sensor 11 is less than a predetermined threshold, or does not light the headlight 14 when the above measurement value is equal to or greater than the predetermined threshold. When the rainfall state is determined in the rainfall determination circuit 21, that is, when the value counted by the counter 23 reaches the predetermined value, the lighting control circuit 26 changes the above threshold.

The counter 23 counts the number of times of the wiping operation performed when the period of time clocked by the timer 24 is less than 15 seconds, which is the maximum interval for wiping operation in the intermittent operation mode of the wiper. In addition, in consideration of a temporary usage of the wiper, for example, when a washer is used, the predetermined value for the counted number of times, used for determining the rainfall state, is 10 times.

The process performed in the automatic lighting control unit 12 will be explained with reference to the flowchart in FIG. 3.

First, when the ignition switch is on and the auto switch is turned on, normal automatic lighting control is started for the non-rain state (see step S1). The threshold in this state is, for example, 300 lx. When the illumination outside the vehicle is lower than this threshold (i.e., when being dark), the headlight 14 is turned on, while when the illumination outside the vehicle is equal to or higher than this threshold (i.e., when being light), the headlight 14 is turned off.

Next, the number of times of wiping by the wiper, counted by the counter 23, is cleared (see step S2), and counting of the number of times of wiping is again started (see step S3). In addition, the (period of) time clocked by the timer 24 is also cleared (see step S4), and clocking of the (period of) time by using the timer 24 is again started (see step S5).

After that, in step S6, it is determined whether the above-explained wiper operation signal has been switched from OFF to ON, that is, the wiping operation using by the wiper has been performed. In other words, it is detected whether the wiping operation has been executed. If it is determined that the wiper operation signal has been switched from OFF to ON (i.e., the result of the determination is YES), then in the next step S7, it is determined whether the period of time clocked by the timer 24 is less than 15 seconds.

If it is determined that the period of time is less than 15 seconds (i.e., YES in the determination), in the next step S8, it is determined whether the number of times, counted by the counter 23, is 10 (times) or greater. If it is determined that the number of times is 10 or greater (i.e., the result of the determination is YES), it is determined that rain is falling on the vehicle (see step S9), and automatic lighting control for rainfall is performed, that is, the above-explained threshold is changed.

If in step S6, the wiper operation signal maintains the OFF state, that is, no wiping operation of the wiper is detected (i.e., NO in step S6), the operation returns to step S5, so that the wiper operation signal is monitored while continuing the clocking by the timer 24, until the state of this signal is switched ON (that is, until the wiping operation is detected).

Even when it is determined in step S6 that the state of the wiper operation signal has been switched from OFF to ON, if it is determined in step S7 that the period of time, clocked by the timer 24, is 15 seconds or longer (i.e., NO in step S6), then time-out is determined and the operation returns to step S1. Accordingly, after the number of times of wiping and the period of time are cleared and the counting and clocking are again started, the wiper operation signal is again monitored.

If it is determined in step S7 that the wiping operation, detected in step S6, has been performed within the period of time of less than 15 seconds, and it is determined in step S8 that the number of times of wiping, counted by the counter 23 is less than 10 times (i.e., NO in step S8), then the operation returns to step S3. Accordingly, the number of times of wiping is increased and the period of time is cleared, and clocking of the period of time is again started. After that, the wiper operation signal is again monitored.

A concrete example of the above operation will be explained with reference to FIGS. 4A to 4D, in which variations of the wiper operation signal, the time clocked by the timer 24, and the number of times counted by the counter 23 are illustrated with respect to the elapsed time (i.e., the horizontal axis). Here, the chain line crossing the solid line of the timer indicates the reset level, that is, when the solid line crosses the chain line, the timer is reset and clocking is again started.

Figure 4A:
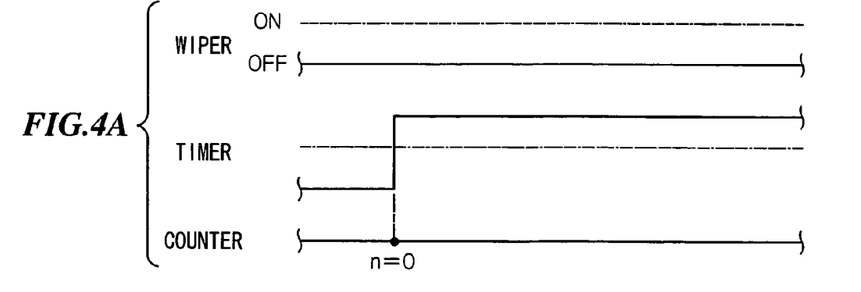
FIGS. 4A to 4D are diagrams for explaining concrete examples of the above operation.

When the ignition switch is on and the auto switch 16 is also switched on, the normal automatic lighting control, suitable for the non-rain state, is started. In this process, as shown in FIG. 4A, the period of time clocked by the timer 24 is cleared and clocking is started, and the number of times of wiping, counted by the counter 23, is reset and counting is started. After that, if no wiping operation is performed, that is, no wiper operation signal is detected, monitoring of the wiper operation signal is continued while continuing the clocking using the timer 24.

Figure 4B:
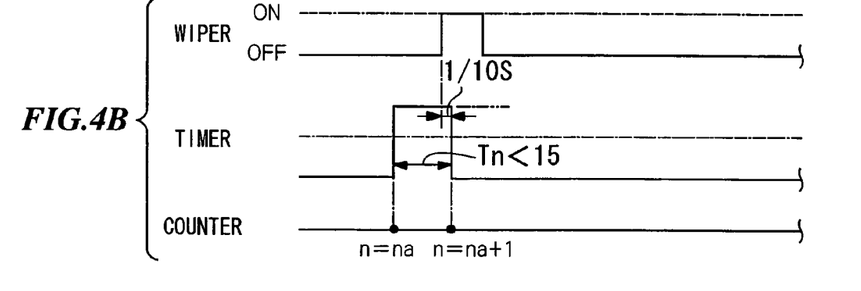

As shown in FIG. 4B, if wiping operation of the wiper is performed when the number of times counted by the counter 23 is "na" (a natural number less than 10, which includes zero) and the period of time, clocked by the timer 24, is less than 15 seconds, the number of times of wiping counted by the counter 23 is increased to na+1 and the period of time clocked by the timer 24 is reset, and then the wiper operation signal is again monitored. In order to prevent erroneously recognizing the wiping operation of the wiper, the automatic lighting control unit 12 employs a filter for recognizing the wiper operation signal maintaining the same value (i.e., level) for 100 msec.

Figure 4C:
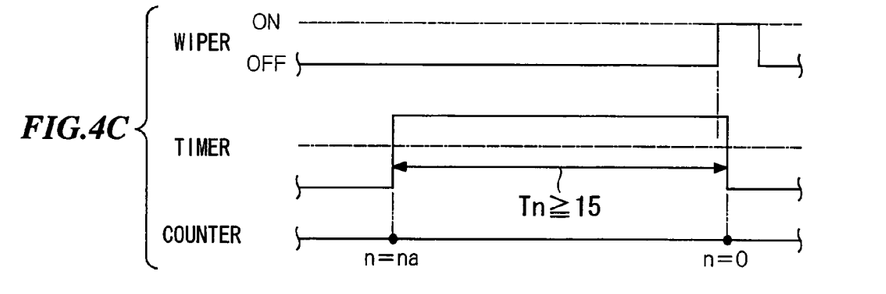

As shown in FIG. 4C, even when the wiping operation of the wiper is performed, if the period of time clocked by the timer 24 is 15 seconds or longer, the number of times and the period of time are cleared and the wiper operation signal is again monitored, so that the number of times of wiping counted by the counter 23 is not increased.

Figure 4D:
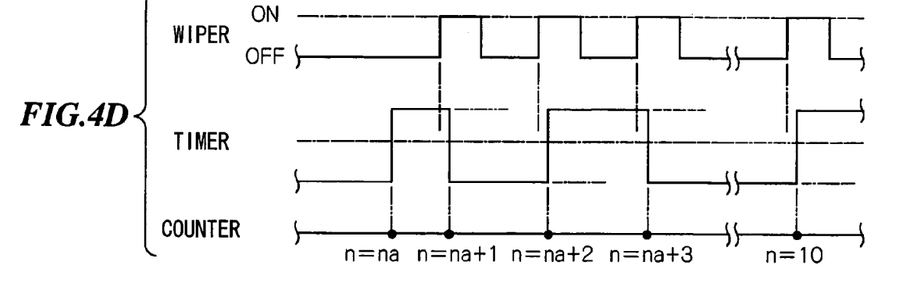

As shown in FIG. 4D, when a cycle, in which the wiper operation signal is performed while the period of time clocked by the timer 24 is less than 15 seconds, is repeated and the number of times, counted by the counter 23, reaches 10 times, specific conditions for determining the rainfall state are satisfied. Therefore, in order to execute the automatic lighting control for rainfall, the threshold of illumination, referred to when the headlight 14 is turned on or off, is changed.

Figure 5:
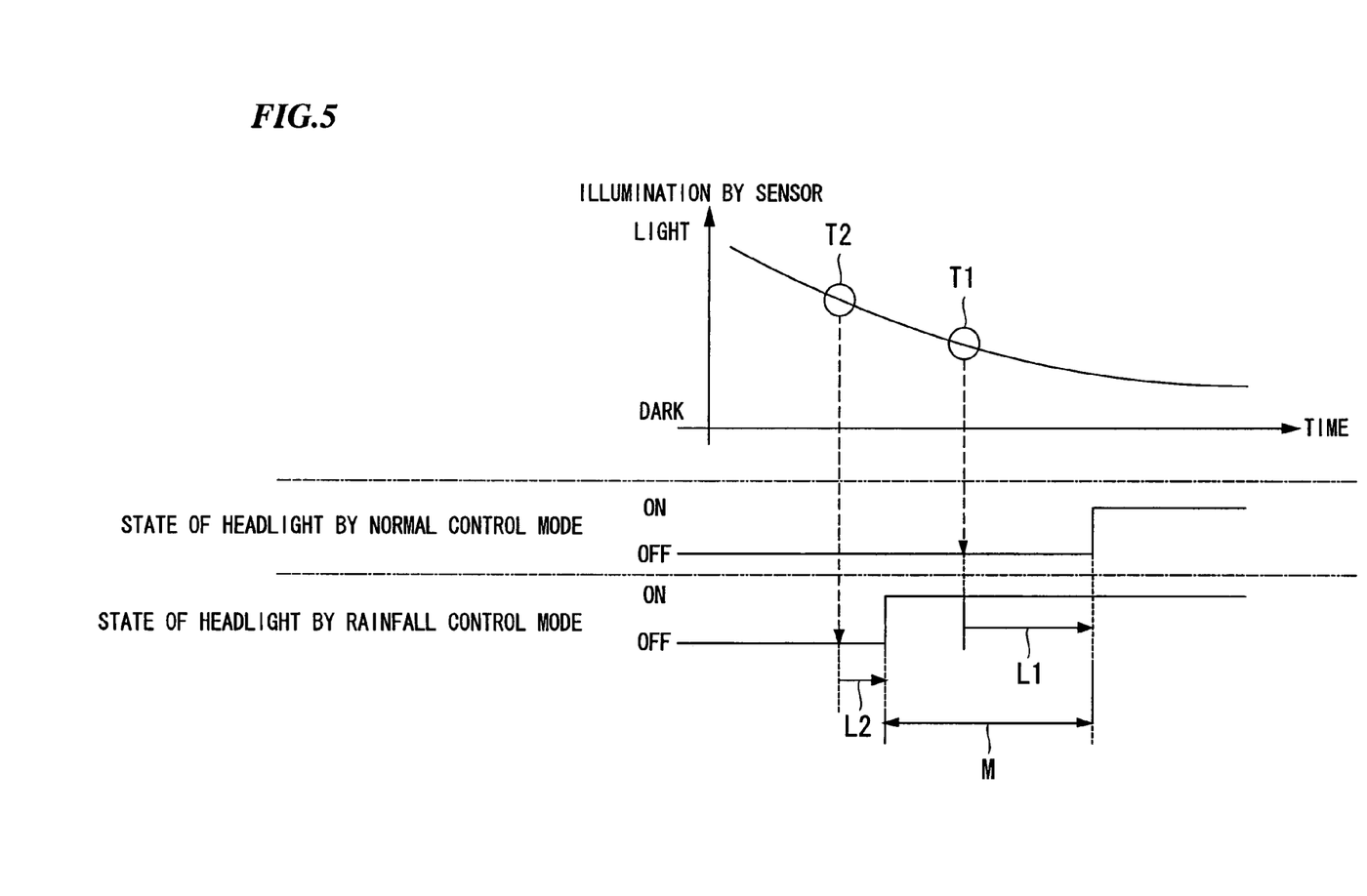
FIG. 5 is a diagram for explaining the function of the above operation.

FIG. 5 is a diagram showing the relationship between (i) the environment outside the vehicle, which becomes dark as times elapses (see the horizontal axis) and (ii) the lighting state of the headlight 14 in the normal control mode or the rainfall control mode. In the diagram, the threshold (e.g., 300 lx) in the normal (automatic lighting) control mode in the non-rain state is indicated by reference symbol T1, and the threshold (e.g., 900 lx) in the rainfall (automatic lighting) control mode in the rainfall state is indicated by reference symbol T2. That is, in the rainfall control mode, the headlight 14 is switched on in a lighter outside environment in comparison with the outside environment corresponding to the normal control mode.

If the illumination outside the vehicle is less than T1 in the normal control mode, the headlight 14 is switched on after a lighting delay time (indicated by reference symbol L1) has elapsed. On the other hand, if the illumination outside of the vehicle is less than T2 in the rainfall control mode, the headlight 14 is switched on after a lighting delay time (indicated by reference symbol L2) has elapsed. Here, the lighting delay time L2 is shorter than the lighting delay time L1.

Accordingly, in the rainfall control mode, the headlight 14 is switched on earlier (in comparison with the normal control mode) by time M which is a temporal difference obtained by adding the period of time from time T2 to time T1 to the temporal difference between the lighting delay time L1 and the lighting delay time L2.

As explained above, the rainfall determination apparatus in the above embodiment determines rainfall based on data relating to the wiping operation of the wiper and includes the detection section 22 for detecting the wiping operation every time this operation is performed, the timer 24 for starting to clock a predetermined time for each wiping operation, the counter 23 for counting the number of times of the wiping operation performed before the predetermined period of time has elapsed time has elapsed, and the determination section 25 for determining that rainfall occurs when the counter 23 counts a predetermined number of times of the wiping operation which is successively performed.

In addition, the rainfall determination method in the above embodiment determines rainfall based on data relating to the wiping operation of the wiper and includes (i) step S6 of detecting the wiping operation every time this operation is performed, (ii) step S5 of starting to clock a predetermined time for each wiping operation, (iii) step S3 of counting the number of times of the wiping operation performed before the predetermined period of time has elapsed, and (iv) step S9 of determining that rainfall occurs when the counter 23 counts a predetermined number of times of the wiping operation which is successively performed.

According to the above structure, only a single timer 24 and a single counter 23 are necessary and clocking and counting of the number of times of the wiping operation can be performed under simple conditions.

Therefore, the structure of the necessary components is simplified and no complicated control is necessary, thereby improving the cost performance, reducing the failure rate, and improving reliability.

The above rainfall determination apparatus is used for performing automatic lighting control for vehicles and includes (i) the illumination sensor 11 for measuring the illumination outside the vehicle, (ii) the rainfall determination circuit 21 for determining rainfall based on data relating to the wiping operation of the wiper, and (iii) the lighting control circuit 26 for lighting the headlight 14 provided at the vehicle when the value measured by the illumination sensor 11 is less than a predetermined value and for changing the predetermined value when the rainfall determination circuit 21 determines that a predetermined condition is satisfied. The rainfall determination circuit 21 includes the detection section 22 for detecting the wiping operation every time this operation is performed, the timer 24 for starting to clock a predetermined time for each wiping operation, and the counter 23 for counting the number of times of the wiping operation before the predetermined period of time has elapsed. The predetermined condition is that the wiping operation performed before the predetermined period of time has elapsed is successively detected and the counted number of times reaches a predetermined value.

The above rainfall determination method is used for performing automatic lighting control for a vehicle which includes (i) the illumination sensor 11 for measuring the illumination outside the vehicle, (ii) the rainfall determination circuit 21 for determining rainfall based on data relating to the wiping operation of the wiper, and (iii) the lighting control circuit 26 for lighting the headlight 14 provided at the vehicle when the value measured by the illumination sensor 11 is less than a predetermined value and for changing the predetermined value when the rainfall determination circuit 21 determines that a predetermined condition is satisfied. The rainfall determination circuit 21 executes step S6 of detecting the wiping operation every time this operation is performed, step S5 of starting to clock a predetermined time for each wiping operation, and step S3 of counting the number of times of the wiping operation before the predetermined period of time has elapsed. The predetermined condition is that the wiping operation performed before the predetermined period of time has elapsed is successively detected and the counted number of times reaches a predetermined value.

According to the above structure, it is possible to change the timing of lighting the headlight in accordance with the result of the determination about the rainfall situation based on the wiping operation of the existing wiper. Therefore, in comparison with the structure using a rain (drop) sensor which employs a photodiode or the like, the present system is inexpensive and can be easily built in an automatic lighting system for vehicles, which is relatively expensive.

That is, the present system can be easily combined with an automatic lighting system for vehicles, thereby improving salability of the automatic lighting system.

Second Embodiment

Below, the second embodiment according to the present invention will be explained.

In comparison with the first embodiment in which the threshold for switching on or off the headlight 14 is changed simply according to the two states which are rainfall and non-rain states, the second embodiment has a distinctive feature of gradually changing the threshold in accordance with an amount of rainfall, which is evaluated based on the wiping operation of the wiper. The parts identical to those in the first embodiment are given identical reference numerals, and explanations thereof are omitted.

Figure 3:
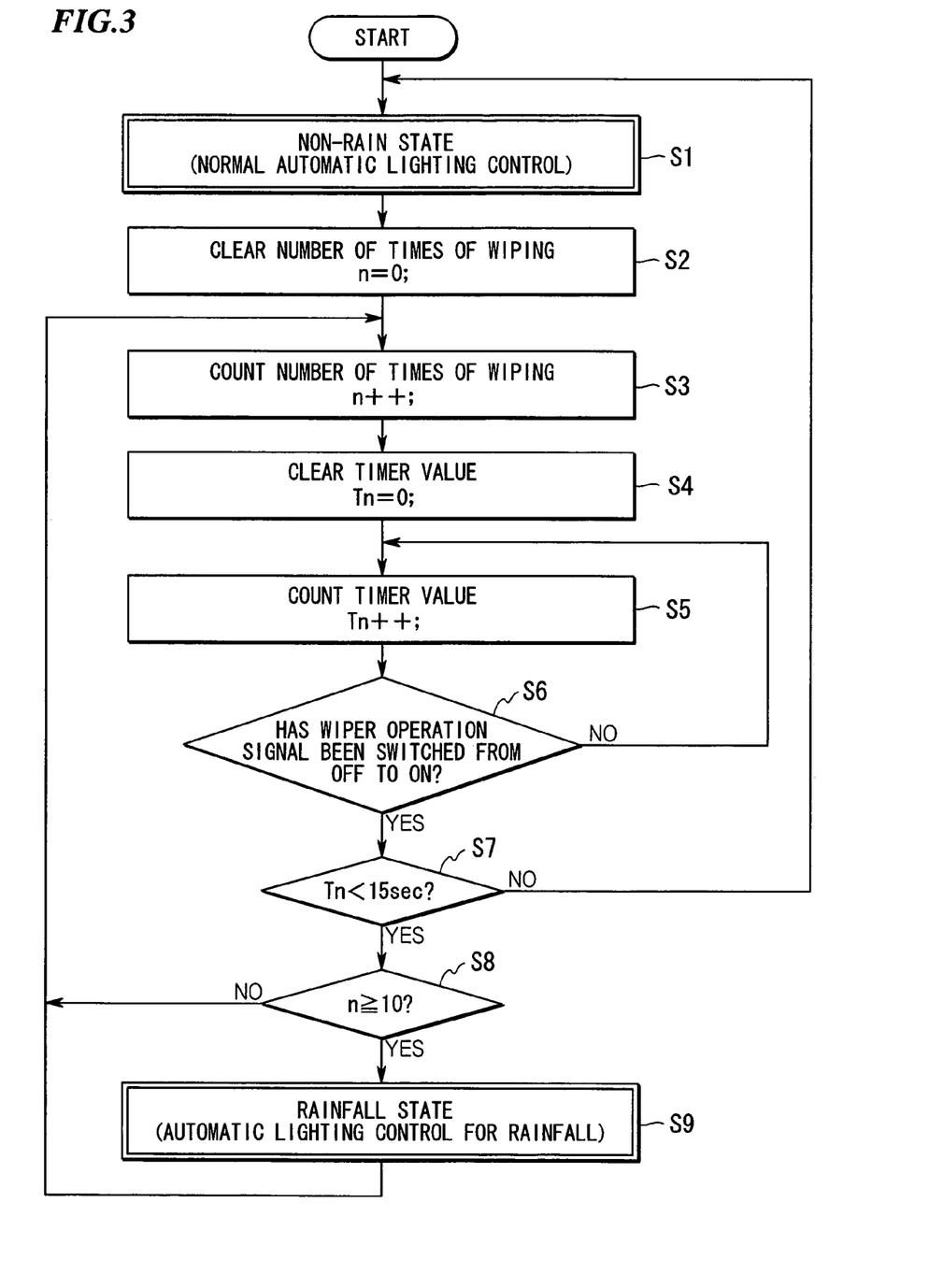
FIG. 3 is a flowchart showing the operation performed by the automatic lighting control unit.

In the second embodiment, in the operation performed by the automatic lighting control unit 12, another specific process is performed when the operation reaches step S9 in the flowchart of FIG. 3.

Figure 6:
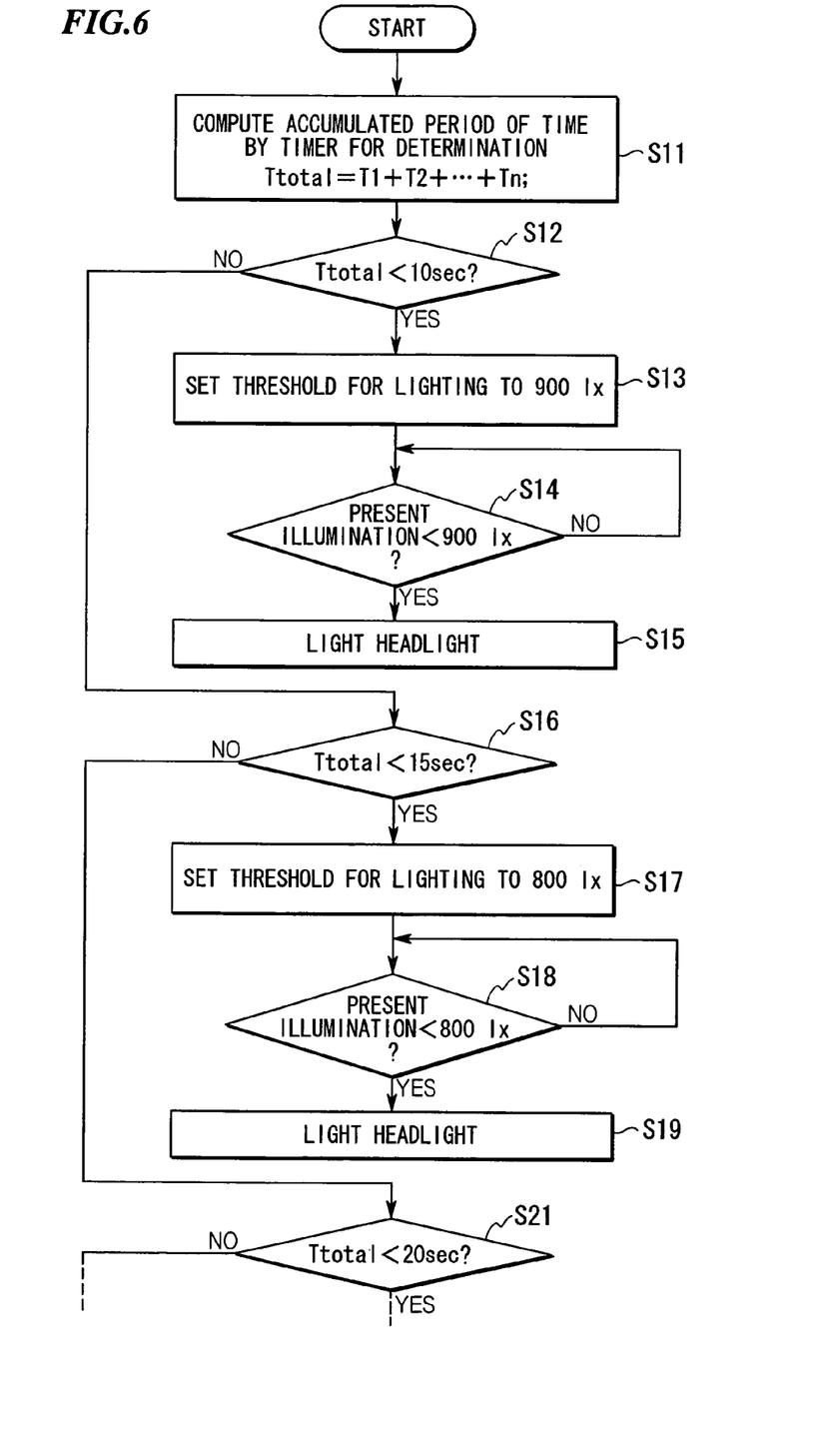
FIG. 6 is a flowchart showing the operation performed when determined that rainfall occurs, in the second embodiment according to the present invention.

The process performed in step S9 in the second embodiment will be explained with reference to the flowchart in FIG. 6. In the first step S11, an accumulated time before the rainfall state is determined is computed, where the accumulated time is obtained by adding each period of time clocked by the timer 24. In the next step S12, it is determined whether the accumulated time is less than 10 seconds. If it is determined that the accumulated time is less than 10 seconds (i.e., YES in the determination), the threshold for lighting the headlight is set to 900 lx (see step S13).

In step S14, it is determined whether the present illumination (outside the vehicle) measured by the illumination sensor 11 is less than 900 lx. If it is determined that the present illumination is less than 900 lx, that is, the outside is darker than 900 lx (i.e., YES is the determination), a designation signal is sent to the headlight and front wiper control unit 13 so as to light the headlight 14 (see step S15). If it is determined in step S14 that the present illumination is equal to or higher than 900 lx, that is, the outside is lighter than 900 lx (i.e., NO in the determination), the illumination outside the vehicle is monitored with respect to the threshold of 900 lx.

If it is determined in step S12 that the accumulated time is 10 seconds or longer (i.e., NO in the determination), the operation proceeds to step S16, where it is determined whether the accumulated time is less than 15 seconds. If it is determined that the accumulated time is less than 15 seconds (i.e., YES in the determination), that is, when it is determined that the accumulated time is 10 seconds or longer and less than 15 seconds, the threshold of the illumination for lighting the headlight is set to 800 lx (see step S17).

In step S18, it is determined whether the present illumination outside the vehicle is less than 800 lx. If it is determined that the present illumination outside the vehicle is less than 800 lx (i.e., YES in the determination), the headlight 14 is switched on (see step S19), while if it is determined that the present illumination is 800 lx or higher (i.e., NO in the determination, the illumination outside the vehicle is monitored with respect to the threshold of 800 lx.

If it is determined in step S16 that the accumulated time is 15 seconds or longer (i.e., NO in the determination), the operation proceeds to step S21, where it is determined whether the accumulated time is less than 20 seconds. After that, a process similar to that explained above is performed.

Here, the period of time necessary for successively repeating the wiping operation (of the wiper) a specific number of times is reduced in accordance with increase in the wiping speed of the wiper. Generally, the wiping speed of the wiper increases in accordance with increase in the amount of rainfall. Therefore, it is estimated that the amount of rainfall is large when the accumulated time is short and that the amount of rainfall is small when the accumulated time is large. Accordingly, the accumulated time for the periods of time clocked by the timer 24 may be grasped using a plurality of ranges so as to determine a threshold (of the illumination for lighting the headlight) for each range (i.e., to determine the threshold which gradually changes). That is, the threshold which gradually changes in accordance with the amount of rainfall outside the vehicle can be determined. Table 1 indicates relationships between the accumulated time by the timer 24 and the threshold of illumination for lighting.

As explained above, in the rainfall determination apparatus and method of the second embodiment, the amount of rainfall is evaluated according to the wiping operation of the wiper, and the threshold is gradually changed in accordance with the evaluated amount of rainfall, thereby improving the functions of the automatic lighting system for vehicles, and further improving the salability of the system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. For example, the rainfall determination apparatus and method according to the present invention may be applied not only to the automatic lighting system for vehicles, but also to an air conditioning system for vehicles, or the like.

Accordingly, the invention is not to be considered as being limited by the foregoing description, and is only limited by the scope of the appended claims.

What is claimed is:

1. A rainfall determination apparatus used for performing automatic lighting control for a vehicle, the apparatus comprises:
    an illumination measuring device for measuring illumination outside the vehicle;
    a rainfall determination device for determining rainfall based on data relating to a wiping operation of a wiper of the vehicle, wherein the rainfall determination device includes a detection device for detecting the wiping operation every time this operation is performed, a timer for starting to clock a predetermined period of time for each wiping operation, and a counter for counting the number of times of the wiping operation before the predetermined period of time has elapsed; and
    a lighting control device for lighting a headlight provided at the vehicle when the illumination measured by the illumination measuring device is less than a threshold value, wherein the threshold value changes based on an accumulated time that is calculated when the counted number of times measured by the counter reaches a predetermined value.

2. The rainfall determination apparatus of claim 1, wherein the accumulated time is calculated by accumulating the period of time clocked by the timer.

3. The rainfall determination apparatus of claim 1, wherein the threshold value is inversely related to the accumulated time.

4. A rainfall determination method used for performing automatic lighting control for a vehicle which comprises an illumination measuring device for measuring illumination outside the vehicle; a rainfall determination device for

TABLE 1

| amount of rainfall | time t before determination of rainfall | | threshold of illumination for rainfall | timing from start of rain to lighting of headlight |
|---|---|---|---|---|
| very large | t > 10 sec | (for high speed wiping) | 900 lx | very quick |
| large | 10 sec ≦ t < 15 sec | : | 800 lx | quick |
| medium | 15 sec ≦ t < 20 sec | (for low speed wiping) | 700 lx | medium |
| small | 20 sec ≦ t < 50 sec | : | 600 lx | slow |
| very small | 50 ≦ t < 150 sec | (for intermittent operation) | 500 lx | slow |
| normal mode (other than rainfall mode) | | | 300 lx | very slow | determining rainfall based on data relating to a wiping operation of a wiper of the vehicle; and a lighting control device for lighting a headlight provided at the vehicle when the illumination measured by the illumination measuring device is less than a threshold value, wherein:

the rainfall determination device executes the steps of:

detecting the wiping operation every time this operation is performed;

starting to clock a predetermined period of time for each wiping operation; and counting the number of times of the wiping operation before the predetermined period of time has elapsed, and the threshold value changes based on an accumulated time that is calculated when the counted number of times reaches a predetermined value.

5. The rainfall determination method of claim 4, wherein the accumulated time is calculated by accumulating the period of time clocked by the timer.

6. The rainfall determination method of claim 4, wherein the threshold value is inversely related to the accumulated time.

* * * * *